United States Patent [19]

Mace et al.

[11] Patent Number: 5,147,252

[45] Date of Patent: Sep. 15, 1992

[54] DIFFERENTIAL UNIT

[75] Inventors: Graham H. Mace, Basildon; Andrew C. Thompson, Attleborough, both of United Kingdom

[73] Assignee: Group Lotus P/C, Norfolk, United Kingdom

[21] Appl. No.: 644,147

[22] Filed: Jan. 22, 1991

Related U.S. Application Data

[63] Continuation-in-part of Ser. No. 365,401, Jun. 13, 1989, abandoned.

[30] Foreign Application Priority Data

Jun. 15, 1988 [GB] United Kingdom ................. 8814226
Jul. 14, 1988 [GB] United Kingdom ................. 8816712

[51] Int. Cl.$^5$ .............................................. F16H 1/38
[52] U.S. Cl. ................... 475/226; 475/252; 475/85; 252/75
[58] Field of Search ............... 475/226, 227, 228, 229, 475/248, 249, 252, 333, 85, 89; 192/21.5; 252/75

[56] References Cited

U.S. PATENT DOCUMENTS

| | | |
|---|---|---|
| 1,859,245 | 5/1932 | Remington . |
| 1,869,528 | 8/1932 | Trbojevich . |
| 2,178,613 | 11/1939 | Seeck ................................ 74/313 |
| 2,462,000 | 2/1949 | Randall ............................. 74/715 |
| 4,389,908 | 6/1983 | Dudek .............................. 475/90 |
| 4,444,298 | 4/1984 | Stangroom ....................... 192/21.5 |
| 4,751,853 | 6/1988 | Dissett ............................. 74/715 |
| 4,802,560 | 2/1989 | Bhadra et al. ................... 188/264 F |
| 4,821,603 | 4/1989 | Russell ............................. 74/715 |

FOREIGN PATENT DOCUMENTS

| | | |
|---|---|---|
| 256240 | 10/1963 | Australia . |
| 44902/72 | 1/1974 | Australia . |
| 71284/74 | 7/1974 | Australia . |
| 0032994 | 8/1981 | European Pat. Off. . |
| 0130806 | 1/1985 | European Pat. Off. . |
| 356401 | 2/1990 | European Pat. Off. ............ 475/248 |
| 1099717 | 1/1968 | United Kingdom . |
| 2229502 | 9/1990 | United Kingdom ................ 475/249 |

Primary Examiner—Richard Lorence
Assistant Examiner—Benjamin Levi
Attorney, Agent, or Firm—Seidel, Gonda, Lavorgna & Monaco

[57] ABSTRACT

A differential unit has axially aligned helically toothed output gears of different diameters to provide an unequal division of the input torque, in meshing relationship with two sets of intermediate gears which mesh together and are rotatable on axes parallel to the output gear axis. The gears of one set of intermediate gears mesh with concentric internally and externally toothed output gears to provide alternative outputs at different torque division rates. Slip within the unit can be opposed by frictional coating on the gears and/or on the housing by which they are carried and/or by a damping fluid which may be an electro-rheological fluid.

19 Claims, 4 Drawing Sheets

DIFFERENTIAL UNIT

CROSS-REFERENCE TO PARENT APPLICATION

This application is a continuation-in-part of application Ser. No. 07/365,401, now abandoned, and filed Jun. 13, 1989, by one of the present inventors, and assigned to the assignee of the present application.

FIELDS OF THE INVENTION

The invention relates to differential units.

BACKGROUND OF THE INVENTION

Differential units are commonly employed in road vehicles to divide the drive from the engine between road wheels on opposed sides of the vehicle. In four-wheel drive vehicles, differential units are employed to divide the engine drive between the front and the rear wheels and the differential unit may be arranged to divide the incoming torque unequally. The unit may be further arranged to impose a degree of slip limitation.

U.S. Pat. No. 4,821,603 in the name Russell discloses a differential unit in which an input torque is divided unequally between two output shafts by the use of a plurality of helical gears and a worm gear. The output shafts are each connected to one of the two helical output gears of different diameters. The output gears are driven to rotate by helical intermediate gears which engage with them. The helical intermediate gears are mounted on a gear carrier and rotate freely with respect to the gear carrier. The gear carrier is driven to rotate about an axis common to both output gears. The intermediate gears each engage with a worm gear. The arrangement enables some variation in the rotation of one output shaft with respect to the other whilst slip is limited since the worm wheel to helical gear mesh involves substantial amounts of sliding and the transmission of torque is comparatively inefficient.

The differential of Russell has two disadvantages. Firstly the cross-axial gearing is known to be limited in torque capacity. Secondly the differential unit lacks compactness since the differential unit in the axial direction must accommodate the diameter of the worm-wheel.

EP 0130806 in the name of Quaife discloses a differential unit which comprises two sets of helical intermediate gears in direct engagement with one another, one set engaging with one output gear and the other set engaging with the other output gear. However, the disclosure teaches only a differential unit having two output gears of the same diameter as is used for splitting torque between half shafts on the same axle. The disclosure does not provide a differential capable of dividing incoming torque unequally nor does the disclosure consider such a possibility.

It is thus an object of the present invention to provide a differential unit in which an input torque is divided unequally between two output shafts by means of a gear mechanism of simple form.

It is a further object of the invention to provide a differential unit incorporating simple means for limiting slip between the output members, which means is preferably selectively adjustable.

SUMMARY OF THE INVENTION

The present invention provides a differential unit comprising: a gear carrier designed for rotation about a first axis; means on said carrier whereby said carrier can receive a drive rotating said carrier about said first axis; first and second toothed output gears of different diameters and mounted for rotation about the first axis; a first plurality of intermediate gears each journalled in a pocket in the carrier to rotate with respect to the carrier about one of a first plurality of intermediate gear axes spaced from and parallel to the first axis, said axes being equally spaced from the first axis at a first radial distance therefrom, and each of the first plurality of intermediate gears in driving engagement with the first output gear, and a second plurality of intermediate gears each journalled in a pocket in the carrier to rotate with respect to the carrier about one of a second plurality of intermediate gear axes spaced from and parallel to the first axis, which axes are equally spaced from the first axis at a second radial distance therefrom, each of the second plurality of intermediate gears in engagement with the second output gear; wherein at least one of the first plurality of intermediate gears meshes with at least one of the second plurality of intermediate gears and the said second radial distance between the second plurality of intermediate gear axes and the first axis is larger than the first radial distance between the first plurality of intermediate gear axes and the first axis.

Preferably the first output gear is of smaller diameter than the second output gear and each of the first plurality of intermediate gears meshes with two of the second plurality of intermediate gears. Preferably each of the second plurality of intermediate gears also meshes with two of the first plurality of intermediate gears.

In one preferred embodiment each of the first plurality of intermediate gears extends over only one of the output gears and each of the second plurality of intermediate gears extends over both of the output gears.

In another preferred embodiment the first and second pluralities of intermediate gears are positioned for rotation within one or more pockets defined by the gear carrier and the two output gears. Preferably the gear carrier comprises a central member which partly defines at least one cavity therewithin extending along the whole length of the carrier in an axial direction, and two end members which are attached to the central member and define at least a portion of each end of the said at least one cavity so as to restrain motion in an axial direction of the intermediate gears within the cavity or cavities.

In a further preferred embodiment, there is provided sealing means for sealing the cavity and the pockets and a lubricant is provided within the cavity. Preferably, the lubricant is a viscous fluid. Preferably, the viscous fluid is an electro-rheological fluid.

The invention further provides a differential unit for a four-wheel drive automobile wherein the gear carrier is driven to rotate by an engine of the automobile and the first output gear is connected to drive one pair of vehicle wheels of the automobile and the second output gear is connected to drive a further pair of vehicle wheels of the automobile.

The intermediate gearing can comprise meshing inner and outer rings of gears rotatable about the common axis of the output gears, the outer ends of the gears meshing with an externally or internally toothed output gear or with an externally and an internally toothed output gear.

The invention also provides a differential unit, comprising a gear carrier arranged to receive a rotational drive, a gear system having intermediate gearing meshing with aligned output gearing supported by the gear carrier, and means for opposing movement of the gear system, comprising frictional surfaces or coatings on at least part of the engaging surfaces of one or more of the gears and/or of the carrier. Additionally or instead, the gearing can move within a mineral or synthetic oil or other viscous fluid. The viscous fluid can be an electro-rheological fluid for selectively adjustable damping. The gear system can include gears with teeth arranged to generate an axial loading of the gears, to promote frictional opposition to gear rotation.

In carrying the invention into effect, the arrangement and number of the intermediate gears, the form of the meshing gear teeth, and the effective radii of the various gears, can be selected according to requirements. Where friction promoting coatings or surfaces are employed the nature and location of these can be chosen to obtain a desired torque bias. Likewise, if the gearing is arranged to move in a damping fluid, the characteristics of the fluid can be selected to afford an appropriate torque bias.

BRIEF DESCRIPTION OF THE DRAWINGS

The invention is further described below, by way of illustration, with reference to the accompanying drawings, in FIG. 1 is a sectional side view of a first differential unit embodying the invention.

Figure 1:
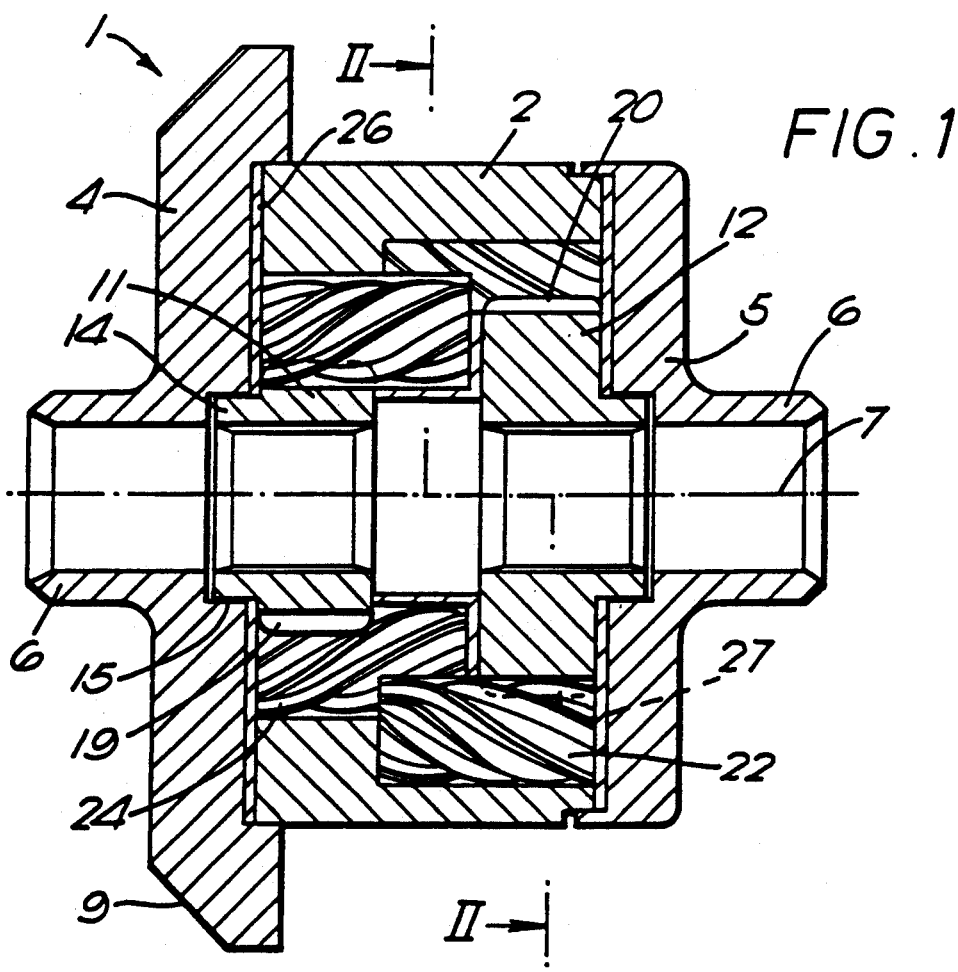
Figure 2:
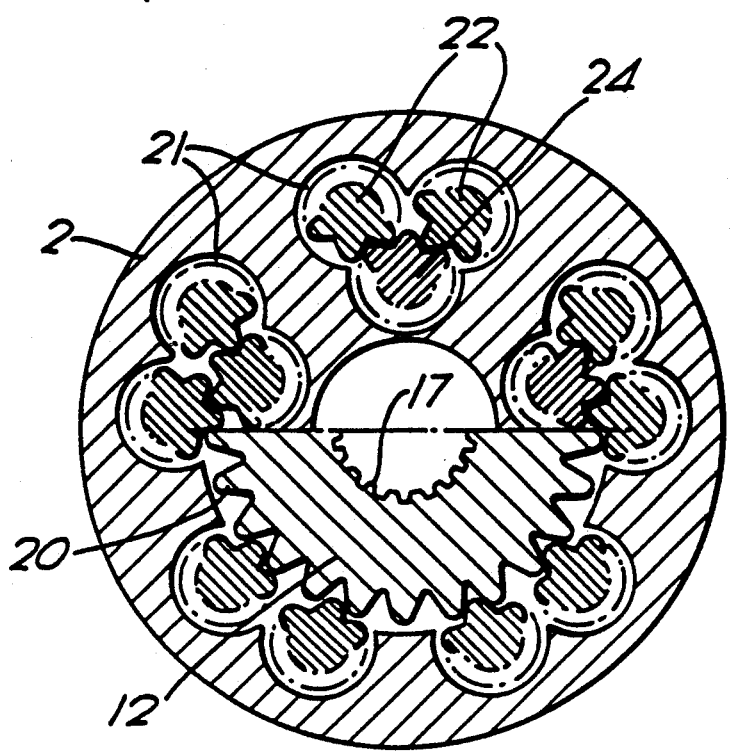
FIG. 2 is a cross-section through the differential unit of FIG. 1, taken along the lines II—II.

The differential unit 1 of FIGS. 1 and 2 comprises a differential gear carrier in the form of a generally cylindrical gear housing 2 secured between first and second end plates 4 and 5. Each end plate is annular and is provided with an outwardly extending hub 6 around its central aperture. The end plate 4 is of greater diameter than the housing 2 and the end plate 5. The carrier can be rotatably driven about the axis 7 common to the housing 2 and the end plates by means of gear teeth provided on a bevelled outer peripheral portion 9 of the end plate 4.

The housing 2 contains within it two annular output gears 11 and 12 spaced apart along the axis 7. Each gear has a hub portion 14 around its central aperture extending axially outwardly into a larger diameter bearing portion 15 of the aperture of the respective adjacent one of the end plates 4 and 5. The central aperture of each of the output gears 11 and 12 is provided with splines 17 for positive rotational connection with an output shaft (not shown) which extends outwardly from the gear through the adjacent hub 6. The output gears 11 and 12 are provided with helical teeth 19 and 20. The gear 11 is of smaller diameter than the gear 12.

The housing 2 also contains five intermediate gear pockets 21 equally angularly spaced around the axis 7. Each pocket 21 contains two outer pinions 22 and one inner pinion 24, all with helical teeth and all journalled on axes parallel to the axis 7. The axes of the two outer pinions 22 are located on a first circle centered on the axis 7, and those of the inner pinions 24 are centered on a concentric circle of smaller diameter. In each pocket, the inner gear 24 meshes with the two outer gears 22 over the axially central portion of the housing 2, between the output gears 11 and 12. All ten of the outer pinions 22 extend to the end plate 5 and mesh with the larger diameter output gear 12 and all five of the inner pinions 24 extend to the end plate 4 and mesh with the smaller diameter output gear 11. The arrangement whereby twice as many pinion gears mesh with the larger diameter output gear 12 as with the smaller diameter output gear 11 tends to reduce gear tooth loadings on the high torque output side of the unit to a level similar to that of its low torque side.

It will be evident that the intermediate gearing constituted by the helically toothed pinions 22 and 24 allows the illustrated differential unit 1 to operate in the same way as conventional differential unit however with an unequal division of the input torque applied to the end plate 4.

The combination of the axial and radial loads due to the helical teeth of the gear system promotes friction between the ends of the gears and pinions and the adjoining surfaces of the housing pockets and the end plates. A resistance of turning is created accordingly to provide a torque biasing effect. This effect can be controlled and selected by suitably coating and/or surfacing the meshing teeth of the gears and pinions. Additionally or instead the gear and pinion end surfaces and the surfaces which they abut can be appropriately coated material and/or surfaced.

Also, or instead, the gear system can be arranged to move within a damping fluid. The system is then sealed within the gear carrier and to achieve this the ends of the housing 2 are received in recesses in the end plates 4 and 5 containing gaskets 26 and 27. The damping fluid can comprise a suitable mineral or synthetic oil, or an electro-rheological fluid, the flow properties or viscosity of which can be selectively controlled by an externally applied electrical field.

Figure 3:
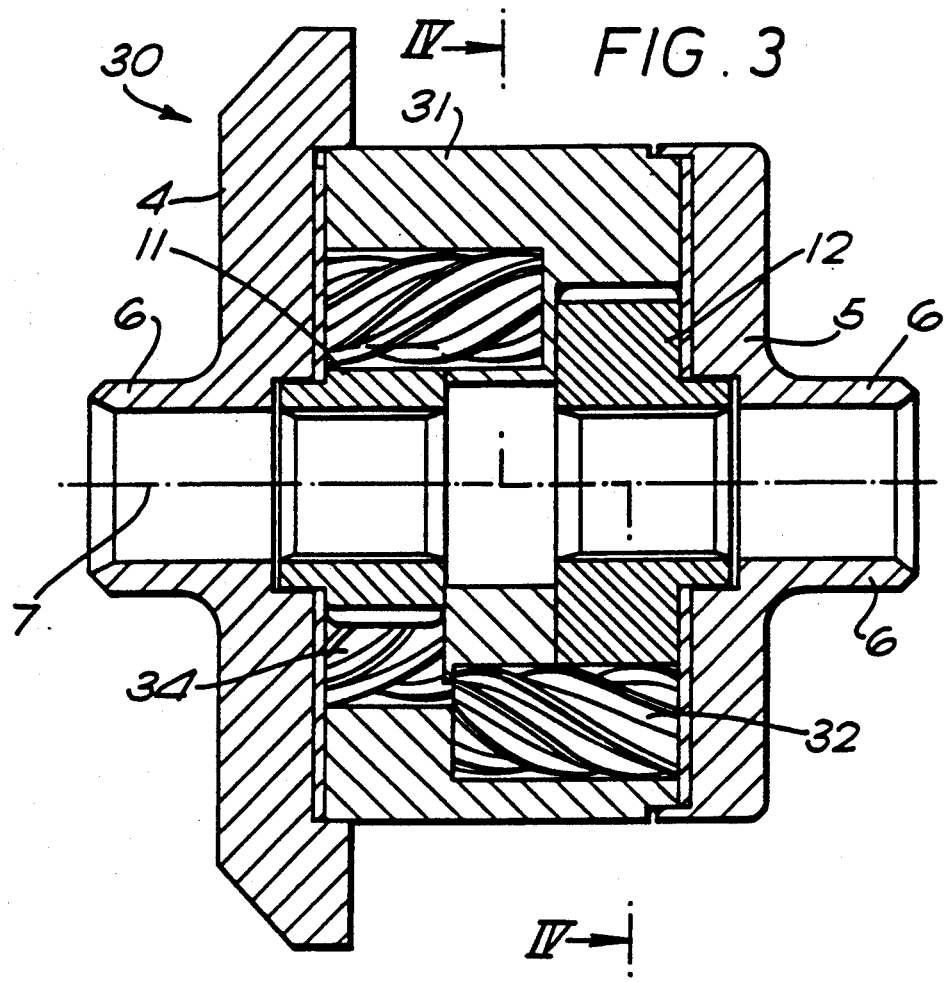
FIG. 3 is a cross-sectional side view of a second different unit embodying the invention.
Figure 4:
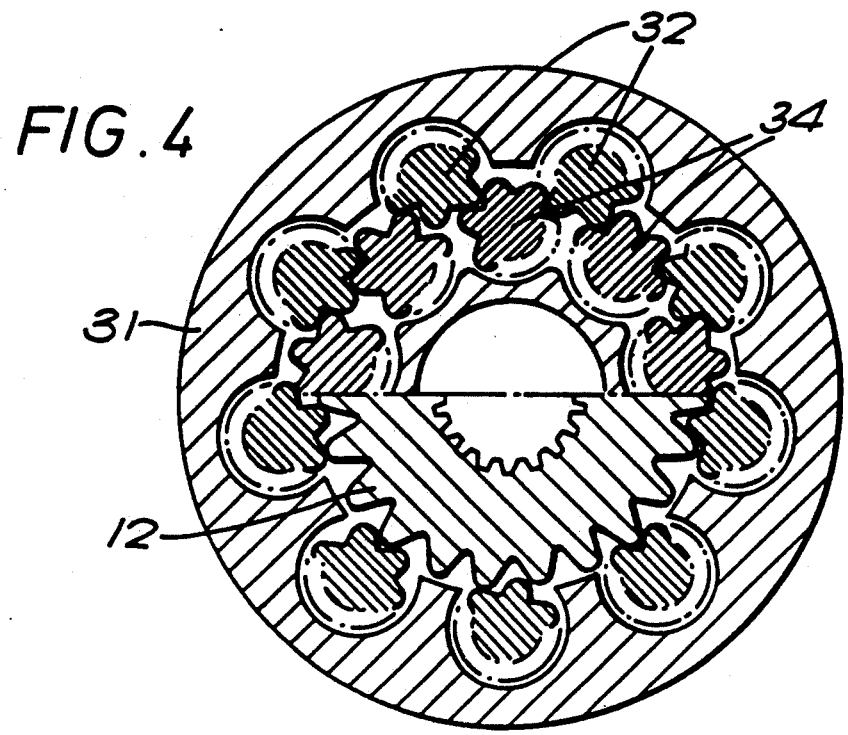
FIG. 4 is a cross-sectional view of the differential unit of FIG. 3, taken on the line IV—IV.

The differential unit 30 of FIGS. 3 and 4 comprises a gear carrier and output gears which correspond to those of FIGS. 1 and 2, and which are accordingly designated by the same reference numerals as are used in those figures. The housing 31 secured between the end plates 4 and 5 however journals within it about axis parallel to the axis 7 an outer ring of equally annularly spaced helically teethed pinions 32. An inner ring of like pinions 34, again equally angularly spaced, is similarly journalled, the two rings being concentric with the axis 7. Each of the inner pinions 34 meshes with the two adjacent pinions 32 of the outer ring over the central portion of the housing 31, and each of the inner ring central portion of the housing 31, and each of the inner ring of pinions 34 meshes with the smaller diameter output gear 11, whilst each of the pinions 32 of the outer rings meshes with the larger diameter output gear 12. Here, an equal number of pinion gears meshes with each output gear.

A third preferred embodiment of the invention will now be described with reference to FIG. 5.

The differential unit 40 of FIG. 5 again comprises a differential gear carrier in the form of a housing 42 with an integral end plate and outwardly extending hub 46. An end plate 45 is secured to the housing 42, the end plate 45 comprising another outwardly extending hub 46. The carrier can again be rotatably driven about the axis 47 common to the housing 42 and the end plate 45 by means of gear teeth 49 provided on a outer peripheral gear wheel 49 secured to the housing 42.

Figure 5:
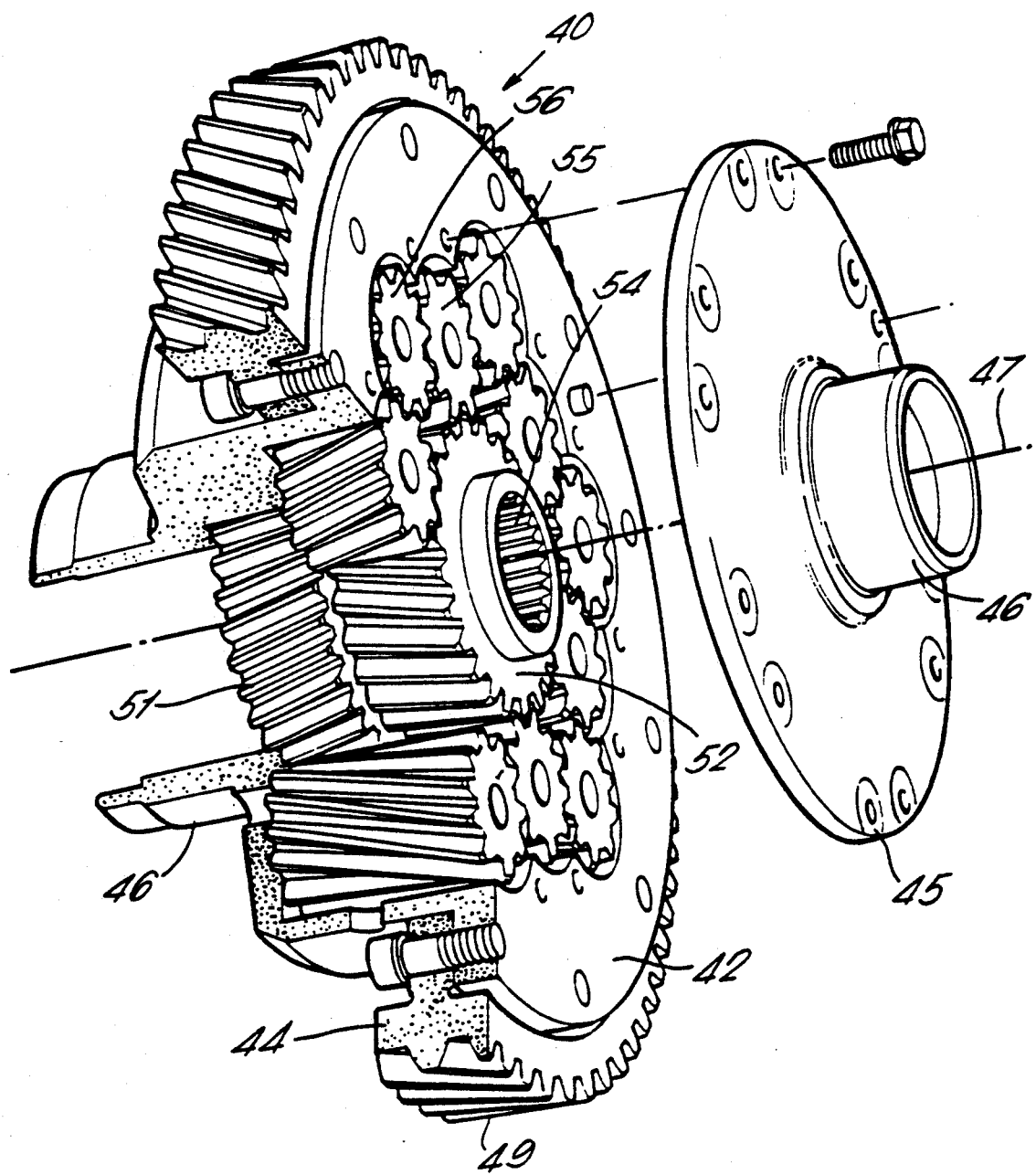
FIG. 5 is an exploded sectional view of a third embodiment of the differential unit.

The gear carrier contains within it at the left-hand end as shown in FIG. 5, an output gear 51 having a hub portion (not shown) around its central aperture extending axially outwardly into a larger diameter bearing portion 46 of the aperture of the housing 42. At the right-hand end, the gear carrier contains an output gear 52 having an internally toothed sleeve portion 54.

The intermediate gearing of the embodiment shown in FIG. 5 is similar to that of the embodiment shown in FIGS. 3 and 4. An inner ring of like pinions 55 are journalled within the housing 42 to rotate about axes parallel to the axis 47. Each of the inner ring of like pinions 55 meshes with the output gear 52 and also two of the pinions 56 of the outer ring. The outer ring of like pinions are journalled again within the housing 42. Each of the outer ring of like pinions 56 engages with two of the inner ring of like pinions 55 and also with the output gear 51.

The main difference between the embodiment shown in FIG. 5 and the embodiment shown in FIGS. 3 and 4 is the difference in size of the pinions 55 of the inner ring. In the embodiment of FIG. 5, the inner ring of pinions 55 extend only over the output gear 54. They are foreshortened in comparison with the equivalent pinion gears shown in FIGS. 3 and 4.

The pinions in the outer ring of pinion gears 56 extend over both of the output gears 51 and 54. Each of the outer ring of pinion gears 56 engages along half of its length with the output gear 51 and along the other half with two of the inner ring of pinion gears 55.

By foreshortening the inner ring of pinion gears 55, the differential unit can be made more compact. The sun gears 51 and 54 can be brought into contact with each other and therefore the differential unit has the minimum possible length in the axial direction. Preferably the abutting surfaces of the two output gears 51 and 54 are provided with a covering of a material, to prevent excessive wear to gear faces.

Figure 6:
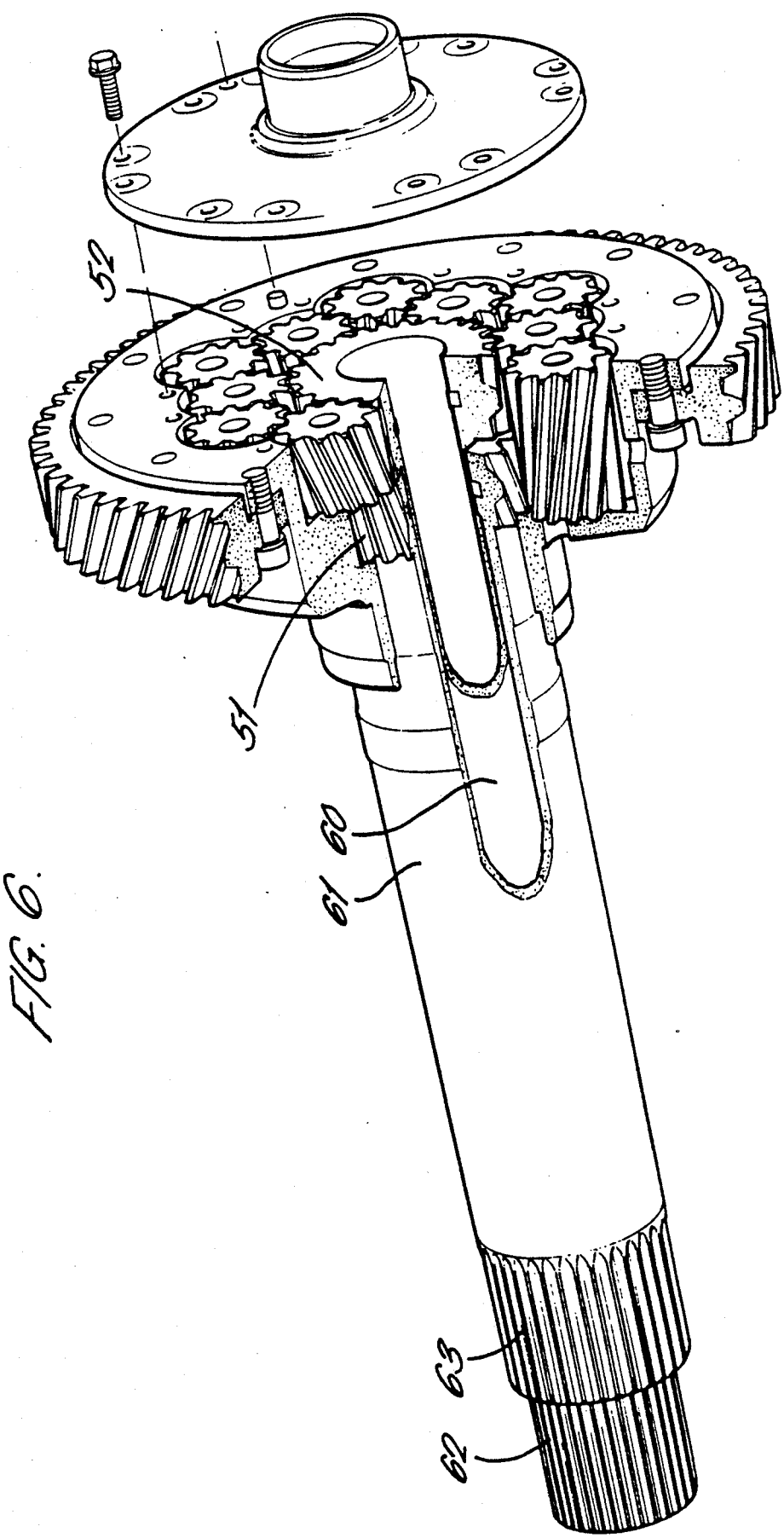
FIG. 6 is an exploded sectional view of a modified version of the third embodiment of the differential unit not shown in FIG. 5.

A modification of the differential unit 40 of FIG. 5 can be seen in FIG. 6. The differential unit shown in FIG. 6 is essentially the same as differential unit 40 shown in FIG. 5. However, the drive from the output gears is taken in a different manner.

In the differential unit 40 of FIG. 5, two output shafts are connected one each to the output gears 51 and 52 such that each shaft extends at the casing in an opposite direction to the other. The splined interiors of each of the output gears 51 and 52 enable the output shafts to be engaged with the output gears.

In the modification of the differential unit shown in FIG. 6 drive is taken from the two output gears 51 and 52 by two co-axial shafts 60 and 61 which extend in the same direction. Both of the output shafts 60 and 61 are hollow. The hollow output shaft 60 is disposed within the hollow output shaft 61. The output shaft 60 is connected to the output gear 52, whilst the output shaft 61 is connected to the output gear 51. Drive may be taken from the two output shafts 60 and 61 by gearing engaging with the splined ends of the shafts 62 and 63.

Each of the differential units of the preferred embodiment is a limited slip differential. In each embodiment friction forces between the pinions and the housing of a differential unit act to limit the relative rotation of the output gears.

In the preferred embodiment of the invention the pinion gears are not in any way rotatably connected to the housing or the end plates of the differential unit. Instead, the pinions are placed in sockets defined within the housing of the differential unit. The pinions are each held in position by interaction between the pinions themselves and also between the pinions and the output gears and the pinions and the housing. Since the pinion gears of the preferred embodiments are not mounted on axles for rotation, radial forces on the pinion gears increase the friction between the pinion gears the housing in which they are journalled. Such radial forces are exerted on the pinion gears during rotation, the forces being proportional to the torque transmitted to the pinion gears. The frictional forces acting between the housing and the pinion gears due to the radial forces act to limit the relative rotation of the output gears. The frictional forces are a function of the radial forces and the speed of rotation of the gears.

In preferred embodiments of the differential unit, sealing means are provided to seal off the cavity or cavities defined within the gear carrier. Lubricant fluid is then provided within the cavity or cavities. The lubricant fluid is preferably a viscous fluid which provides viscous forces acting to resist rotation of the intermediate gears, thereby enhancing the limited slip characteristics.

In one preferred embodiment the viscous fluid is an electro-rheological fluid. The viscosity of an electro-rheological fluid can be varied by the application of an electrical field. An electrical field can be provided in a differential unit which may be controlled either by a processor or directly by the driver, to vary the limited slip characteristics of the differential unit. A processor could sense the relative rotation of the two output gears and accordingly generate control signals to vary the viscosity of the electro-rheological fluid.

In one preferred use, the differential unit is employed to split drive between the front wheels and rear wheels of a four wheel drive vehicle. In many cases it has been found beneficial to deliver more power to one set of wheels rather than the other. By non-uniform distribution of power between the front and rear wheels of a vehicle beneficial driving characteristics can be obtained.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A differential unit comprising:

a gear carrier designed for rotation about a first axis;

means on said carrier whereby said carrier can be rotated about said first axis;

first and second toothed output gears of different diameters, each gear being mounted in the carrier for rotation about the first axis;

a first plurality of intermediate gears, each journalled in a pocket in the carrier to rotate with respect to the carrier about a first plurality of intermediate gear axes spaced from and parallel to the first axis, said first plurality of axes being equally spaced from the first axis at a first radial distance therefrom, and each of the first plurality of intermediate gears in driving engagement with the first output gear, a second plurality of intermediate gears each journalled in a pocket in the carrier to rotate with respect to the carrier about a second plurality of intermediate gear axes spaced from and parallel to the first axes, said second plurality of axes being equally spaced from the first axis at a second radial distance therefrom, each of the second plurality of intermediate gears in driving engagement with the second output gear;

wherein at least one of the first plurality of intermediate gears meshes with at least one of the second plurality of intermediate gears and the said second radial distance between the second plurality of intermediate gear axes and the first axis is larger than the first radial distance between the first plurality of intermediate gear axes and the first axis.

2. The differential unit of claim 1 wherein the first output gear is of smaller diameter than the second output gear and each of the first plurality of intermediate gears meshes with two of the second plurality of intermediate gears.

3. The differential unit of claim 2 wherein each of the second plurality of intermediate gears meshes with two of the first plurality of intermediate gears.

4. The differential unit of claim 1 wherein each of the first plurality of intermediate gears extends over only one of the output gears and each of the second plurality of intermediate gears extends over both of the output gears.

5. The different unit of claim 1 wherein the first and second pluralities of intermediate gears are positioned for rotation within at least one of said pocket defined by the gear carrier and the two output gears.

6. The differential unit of claim 5 wherein the gear carrier comprises a central member which partly defines at least one cavity therewithin extending along the whole length of the gear carrier in an axial direction, and two end members which are attached to the central member and define at least a portion of each end of the said at least one cavity so as to restrain motion in an axial direction of the intermediate gears with the cavity.

7. The differential of claim 6 wherein there is provided sealing means for sealing the cavity and the pockets and wherein a lubricant fluid is provided within the cavity and the pockets.

8. The differential unit of claim 7 wherein the lubricant fluid is a viscous fluid.

9. The differential of claim 8 wherein the viscous fluid is an electrical-rheological fluid.

10. A differential unit as claimed in claim 1 for a four-wheel drive automobile wherein the gear carrier is driven to rotate by an engine of the automobile and the first output gear is connected to drive one pair of vehicle wheels of the automobile and the second output gear is connected to drive a further pair of vehicle wheels of the automobile.

11. The differential unit of claim 1 wherein the first and second pluralities of intermediate gears are all helical gears and all of the first plurality of intermediate gears are helical in a first sense opposite to the sense of the helical second plurality of intermediate gears.

12. The differential unit of claim 11 wherein the first and second output gears are both helical and the first output gear is helical in a sense opposite to the sense of the helical first plurality of intermediate gears and opposite to the sense of the helical second output gear.

13. The differential unit of claim 4 wherein the two output gears abut each other along opposing faces.

14. The differential unit of claim 1 wherein the first and second pluralities of intermediate gears are all of identical diameter, each having the same diameter along the entire axial length thereof.

15. A differential unit comprising:
a gear carrier designed for rotation about a first axis,
means on said carrier whereby said carrier can be rotated about said first axis;
first and second output gears of different diameters, each being mounted in the carrier for rotation about the first axis and each having external teeth;
a first plurality of intermediate gears, each journalled in a pocket in the carrier to rotate with respect to the carrier about a first plurality of intermediate gear axes spaced from and parallel to the first axis, said first plurality of axes being equally spaced from the first axis at a first radial distance therefrom, and each of the first plurality of intermediate gears having external teeth which mesh with the external teeth of the first output gear;
a second plurality of intermediate gears, each journalled in a pocket in the carrier to rotate with respect to the carrier about a second plurality of intermediate gear axes spaced from and parallel to the first axis, said second plurality axes being equally spaced from the first axis at a second radial distance therefrom, and each of the second plurality of intermediate gears having external teeth which mesh with the second output gear;
wherein at least one of the first plurality of intermediate gears has external teeth which mesh with the external teeth of at least one of the second plurality of intermediate gears and the said second radial distance between the second plurality of intermediate gear axes and the first axis is larger than the first radial distance between the first plurality of intermediate gear axes and the first axis.

16. The differential unit of claim 15 wherein the first and second pluralities of intermediate gears are all helical gears and all of the first plurality of intermediate gears are helical in a first sense opposite to the sense of the helical second plurality of intermediate gears.

17. The differential unit of claim 16 wherein the first and second output gears are both helical and the first output gear is helical in a sense opposite to the sense of the helical second output gear.

18. The differential unit of claim 17 wherein the two output gears abut each other along opposing faces.

19. The differential unit of claim 18 wherein the first and second pluralities of intermediate gears are all of identical diameter, each having the same diameter along the entire axial length thereof.

* * * * *